Figure 1:
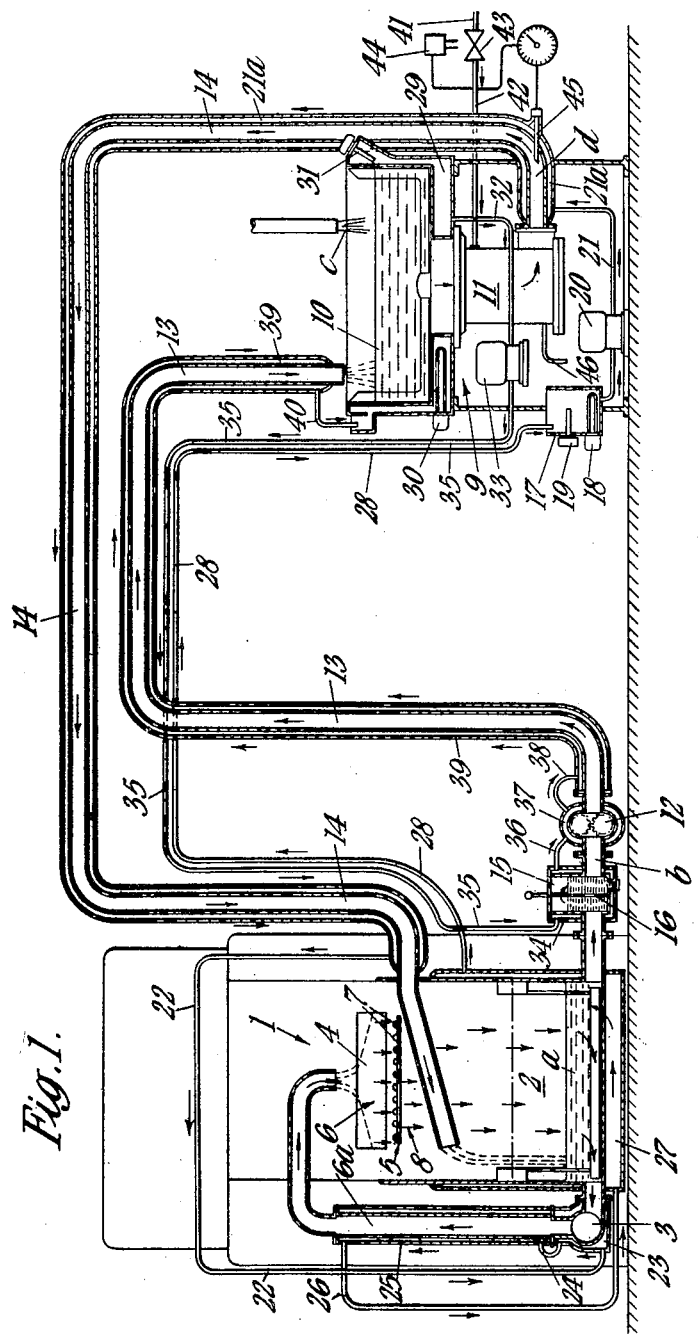

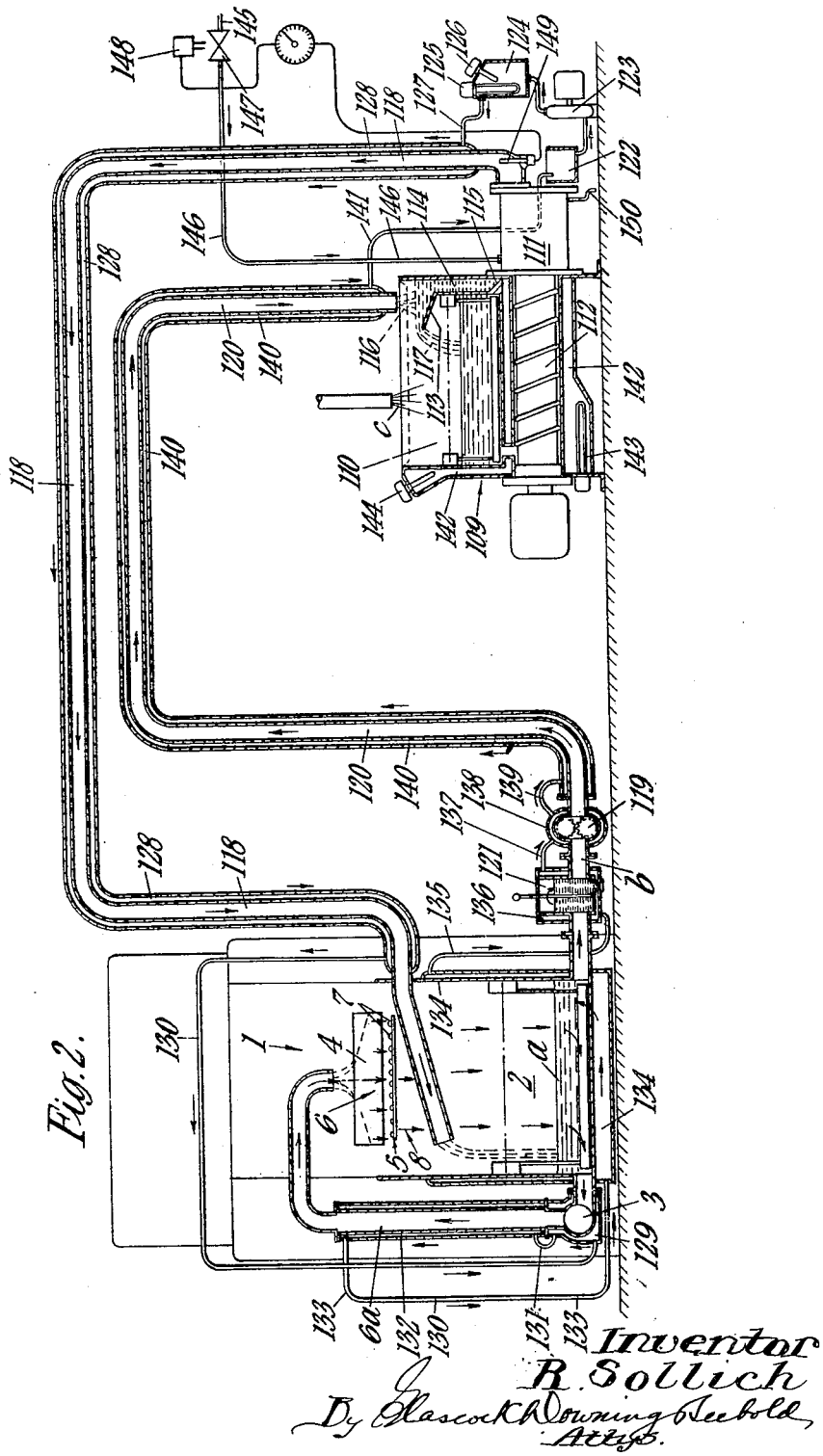

3,021,779
CIRCULATION TEMPERING OF CHOCOLATE
AND SIMILAR SUBSTANCES
Robert Sollich, 101 Volkhausenstrasse, Bad
Salzuflen, Germany
Filed Feb. 16, 1959, Ser. No. 793,531
5 Claims. (Cl. 99—236)

This invention relates to treatment machines using chocolate and other similar fat-containing substances (hereinafter referred to as chocolate), such as moulding machines and especially enrobing and bottoming machines, and more particularly to the preparation and feeding of the chocolate to be moulded or applied as a coating.

It is known that a chocolate mixture must be in a particular condition immediately before it is used if the confection prepared from the mixture is to be of high quality. To establish the proper condition the following requirements must be fulfilled:

(1) The temperature of the chocolate must be approximately 31° C., and (2) The chocolate must be in a state in which the fatty components of the cocoa butter are in a state of incipient crystallisation and the mixture is permeated with "seed crystals," i.e. in a condition in which the chocolate has a certain content of fatty solidification products.

If the above conditions 1 and 2 are simultaneously satisfied, then the chocolate is said to be "conditioned." It is also known that it is impossible to keep chocolate so conditioned for long periods and although the requirements of condition 1 can be readily satisfied, condition 2 is not permanent because incipient crystallisation of the fatty components is not by nature a stable condition. Crystallisation is a continuous process and in course of time an excess of fatty solidification products will form, and this process is further accelerated by the agitation of the chocolate which is technologically necessary. Also, together with this progressive increase in the quantity of solidification products, there is a change in viscosity leading to a thickening of the chocolate, the viscosity increasing rapidly as soon as a particular critical point has been reached, because apart from the continued formation of solid products, the air which is entrained in the chocolate by the aforementioned agitation will have an effect similar to that which occurs when whipping cream. When the chocolate is in a thickened state it is usually referred to as "overconditioned" (although the temperature may be correct as specified in condition 1 above). An overconditioned mixture cannot be utilised or at least it can be moulded only with considerable difficulty and will then produce an inferior confection.

This difficulty must always be overcome when it is necessary to store chocolate in a conditioned state for an extended period of time. If the manufacture consists in continuously processing a large quantity of chocolate, for instance in the metered moulding of tablets and bars, then these difficulties are capable of being surmounted. However, the difficulty at once becomes exceedingly hard to overcome when an excess of chocolate must be permanently available and the unused surplus rejoins the stock. This situation always arises in certain types of treatment machine, such as enrobers, in which the goods that are to be coated, such as biscuits, retain only part of the chocolate, and the remainder runs off the goods and is collected for re-use.

In previous attempts to overcome the abovementioned difficulties it has been proposed to add intermittently warm cocoa butter to the conditioned chocolate. This increases the mobility of the mixture but it also changes its composition, and the change occurs in discontinuous steps, which is an undesirable feature in a continuous process where uniformity of the product should be maintained.

Another previous proposal, known as "drip-feeding," consists in continuously feeding during the process unconditioned chocolate (i.e. chocolate which is so hot that seed crystals cannot form) into the stock of conditioned chocolate. The addition of the unconditioned chocolate is aimed at preventing the stock of conditioned chocolate from becoming over-conditioned whilst simultaneously conditioning the added chocolate so that the chocolate fed to the enrobing or other treatment machine will always be uniformly and correctly conditioned. In theory this proposal may seem acceptable, but in actual practice it meets with considerable difficulties, especially if the ratio of returned surplus chocolate to the utilised chocolate is very high (in enrobers this ratio is usually higher than 6:1).

It is the object of the invention to overcome the difficulties that have been described and at the same time to obtain further advantages, without necessitating any alteration in the method of working or in the construction of existing and therefore known machines. Alternatively, according to the present invention, the apparatus may be incorporated in a new machine.

It is a further object of the invention to provide an improved water jacketing system for the apparatus.

The invention consists in a process for the storage and treatment of chocolate for moulding, enrobing and bottoming or like treatment machines wherein, from a supply of chocolate kept in a tempered state in the manner normal for such treatment machines, an adjustable portion is continuously withdrawn, the whole or part of which portion is brought to a temperature ensuring the melting of all fat-solidification products, and then, after the addition, if desired, of further untempered chocolate, this whole- or part-portion is cooled to a temperature occasioning the formation of fresh fat-solidification products, and is continuously returned, in a freshly tempered state, to the chocolate supply.

The invention further consists in apparatus for carrying out the process set forth in the preceding paragraph, wherein a tempering device is connected to the storage receptacle of the treatment machine by conduit means providing a circulation of chocolate from the storage receptacle, through the tempering device, and back into the storage receptacle.

The invention still further consists in apparatus according to the preceding paragraph wherein the temperature of the chocolate circulating between the output from and the input to the tempering device including the chocolate in the treatment machine is governed by a common heated water circulating system.

For this purpose it is proposed to withdraw continuously, from the supply of chocolate material ($a$) kept in the usual manner in a tempered state of the particular treatment machine in question (e.g. an enrober) portions ($b$) of optional size, to bring these to a temperature ensuring the melting of all fat-solidifying products, then after the addition, if desired, of further untempered chocolate material, to cool these portions down to a temperature occasioning the formation of fresh fat-solidifying products, and to feed them in a freshly tempered state ($d$) to the supply ($a$). For carrying out this process there is employed as a supplementary appliance to the treatment machine, a tempering device of a kind which may be known in itself, which according to the invention is connected to the storage receptacle of the treatment machine in such a way as to give rise to a circulation of material out of the storage receptacle, through the tempering device and back into the storage receptacle.

In the accompanying drawings:

FIGURE 1 is a somewhat diagrammatic sectional side elevation of chocolate tempering and enrobing apparatus incorporating the present invention, and FIGURE 2 is a similar view of an alternative chocolate tempering and enrobing apparatus incorporating the present invention.

In carrying the invention into effect, according to one mode by way of example, FIGURE 1 shows apparatus including on the left an enrober 1 of a kind known in itself, which comprises a storage receptacle 2, a pump 3, a delivery device 4, and a conveyor 5, and in which the tempered chocolate 6 taken via a pipe 6a from the storage receptacle 2 is supplied in excess to articles 7 to be coated on the conveyor 5 (i.e. only a proportion of the chocolate remains on the articles), the unused residue 8 flowing back into the storage receptacle 2. Now, according to the invention, the enrober 1 (known in itself) is associated with a tempering device 9 which, likewise may be known in itself, and which comprises a heating (de-tempering) tank 10 and a cooling (re-tempering) device 11. The enrober 1 and the tempering device 9 are so connected with one another as to give rise to a circulation of chocolate. For this purpose, besides the self-explanatory pipe connections shown in the drawing, a feeding pump 12 which may have a variable speed drive to adjust its output is provided, which continuously withdraws a portion $b$ from the supply $a$ of tempered chocolate in the storage receptacle 2 and delivers it through a pipe 13 to the heating tank 10. The heating tank 10 is at such a temperature, usually about 36 to 40° C., that all the fat-solidification products of the tempered chocolate flowing into it are melted. By the addition, at $c$, of further untempered chocolate to the heating tank 10, the quantity of chocolate used in the enrober 1 is replaced. From the heating tank 10 the detempered chocolate passes to the cooling device 11, which acts also as a conveyor, in known manner by means of a rotary worm device therein, and in which the material is cooled to a temperature occasioning the formation of fresh crystallisation nuclei. The chocolate $d$, thus freshly tempered, is returned to the storage receptacle 2 via a pipe 14.

Thus any one volume of the tempered chocolate $a$ remains in the storage receptacle 2 for only a limited period such that the chocolate cannot become over-tempered. Each volume supplied to the storage receptacle 2 by the freshly tempered chocolate $d$ is within a comparatively short period either used by coating the articles 7 or incorporated afresh in the circulation of chocolate, that is to say, returned again to the heating tank 10. This ensures that the supply of chocolate $a$ in the storage receptacle 2, continually supplemented by the influx of the freshly tempered chocolate $d$, is, for as long as may be desired, in the correct state for use. Even if the above-mentioned disadvantageous conditions are present, for example, only one-seventh of the material supplied being retained by the articles 7 to be coated, and the remaining six-sevenths flowing back into the storage receptacle 2, the chocolate $a$ can be prevented, by suitably increasing the outflow of chocolate $b$ from the storage receptacle 2, from becoming over-tempered.

Further, according to the invention, the storage receptacle 2 is connected with the feeding pump 12 by means of a weir device 15 comprising a plate 16 over the top of which chocolate will normally flow but which will retain a predetermined minimum level of chocolate in the storage receptacle 2, i.e. the level of the top of the weir plate 16. Thus, even under exceptional circumstances there is a supply of chocolate in the storage receptacle 2 available for the pump 3. The weir device 15 may be rendered inoperable by arranging the weir plate 16 to be lifted bodily away so that a clear passage is obtained to empty the storage receptacle 2 completely into the heating vessel 10 via the pump 12 and the pipe 13, for instance when the plant is to be out of operation for a considerable time. When operation is resumed, freshly tempered chocolate can be delivered immediately from the heating tank 10 through the cooling device 11 and the pipe 14 to the storage receptacle 2.

In order to provide the necessary heat conditions for the chocolate at various parts of the apparatus, the apparatus components and the pipes inter-connecting them are water-jacketed and hot or cold water circulated thereto by a pipe system, as described in more detail below:

(*a*) *Tempered chocolate system.*—Heated water from a tank 17, having an immersion heater 18 controlled by a thermostat 19, is fed by a pump 20 through a pipe 21 to the jacket 21a of the pipe 14 connecting the tempering device 9 with the enrober 1. From the other end of the jacket 21a a pipe 22 leads the water to the jacket 23 of the pump 3, which feeds chocolate from the storage receptacle 2 up the pipe 6a to the delivery device 4, and then by a short pipe 24 to the jacket 25 of the pipe 6a. The other end of the jacket 25 is connected by a pipe 26 to the jacket 27 of the enrober storage receptacle 2 whence a pipe 28 returns the water to the tank 17.

(*b*) *De-tempering system.*—The heating tank 10 of the tempering device 9 has a water jacket 29 having an immersion heater 30 controlled by a thermostat 31, and water is drawn from the jacket 29 through a pipe 32 by a pump 33 which feeds the water to the water jacket 34 of the weir device 15 through a pipe 35. The jacket 34 of the weir device 15 is connected by a short pipe 36 to the water jacket 37 of the pump 12, whose jacket is in turn connected by a short pipe 38 to the jacket 39 of the pipe 13 by which chocolate withdrawn by the pump 12 from the enrober storage receptacle 2 is returned to the tempering device 9. At the other end of the jacket 39 of the pipe 13, the water is returned to the jacket 29 of the heating tank 10 through a pipe 40.

(*c*) *Cooling (re-tempering) system.*—Cold water from a main supply 41 is connected to the water jacket (not shown) of the cooling device 11 of the tempering device 9 by a pipe 42 through a valve 43 operated by motor means 44 controlled by a thermostat 45 in the pipe 14 at the outlet from the cooling device 11. After circulating through the jacket of the cooling device 11, the water is discharged through a free outlet 46.

In carrying the invention into effect, according to a modified form of the previously described embodiment, FIGURE 2 shows on the left an enrober 1 similar to that shown in FIGURE 1, which will not therefore be described again.

The enrober 1 is coupled to an alternative form of tempering device 109, which in essentials comprises a heating (de-tempering) tank 110 and a cooling (re-tempering) device 111 inter-connected by a chocolate-propelling worm device 112 below the heating tank 110. Within the heating tank 110 a baffle 113 partitions off one end of the tank to provide a small reservoir 114 and conduit 115 which receive and retain a portion of the chocolate 116 returned from the enrober 1, as will be described, and feed it without substantial de-tempering direct to the cooling device 111 in a predetermined proportion to the de-tempered chocolate fed to the cooling device 111 by the worm device 112, the residue 117 of the returned chocolate being received by the heating tank 110.

To effect circulation of the chocolate from the tempering device 109 to the enrober 1 and back, a pipe system as follows is provided. Re-tempered chocolate from the cooling device 111 is forced by rotation of the worm device 112 along a pipe 118 to replenish the chocolate in the storage receptacle 2 of the enrober 1. A feeding pump 119 (similar to the pump 12 of FIGURE 1) of adjustable output continuously withdraws a portion $b$ from the supply $a$ of tempered chocolate in the storage receptacle 2 and delivers it to the heating tank 110 through a pipe 120 to provide the above-mentioned supply of returned chocolate 116.

The treatment of the chocolate in the tempering device 109 is substantially the same as described with reference to FIGURE 1, with the exception that the stream 116 is divided into two parts. Further the level of the chocolate *a* in the storage receptacle 2 of the enrober 1 is maintained by a weir device 121 also as described with reference to FIGURE 1.

In order to provide the necessary heat conditions for the chocolate at various parts of the apparatus, the apparatus components of FIGURE 2 and the pipes interconnecting them are water jacketed and hot or cold water circulated thereto by a pipe system, as described in more detail below:

(i) *Tempering chocolate system.*—Water (heated) is circulated from an open receiving tank 122 by a pump 123 to a heating tank 124, having an immersion heater 125 controlled by a thermostat 126, where the heat of the water is adjusted (i.e. brought up to temperature again). From the heating tank 124 the water passes along a pipe 127 to the water jacket 128 of the pipe 118. At the other end of the pipe 118, the water is fed sequentially to the water jacket 129 of the pump 3 via a pipe 130, thence via a short pipe 131 to the jacket 132 of the pipe 6a, from the upper end of the jacket 132 of which a pipe 133 delivers the water to the jacket 134 of the storage receptacle 2 of the enrober 1. The top of the jacket 134 is connected by a pipe 135 to the jacket 136 of the weir device 121 which in turn is connected by a short pipe 137 to the jacket 138 of the feeding pump 119. The pump jacket 138 is connected by a pipe 139 to the jacket 140 of the pipe 120 and, at the other end of the jacket 140, a pipe 141 returns the water to the open receiving tank 122 thus completing the circuit.

(ii) *De-tempering system.*—The heating tank 110 and the feeding worm 112 have a common water jacket 142, in which the water is heated by an immersion heater 143 controlled by a thermostat 144.

(iii) *Cooling (re-tempering) system.*—Cold water from a main supply 145 is connected to a water jacket (not shown) of the cooling device 111 of the tempering device 109 by a pipe 146 through a valve 147 operated by a motor means 148 controlled by a thermostat 149 in the pipe 118 at the outlet from the cooling device 111. After circulating through the jacket of the cooling device 111, the water is discharged through a free outlet 150.

In the above described arrangement of FIGURE 2, the temperature of the chocolate at any part of the system, except where it is being de-tempered in the heating tank 110 and feeding worm 112 or re-tempered in the cooling device 111 of the tempering device 109, is governed by a single water circulating system, thermostatically controlled at one point.

In the arrangement of FIGURE 1, two heated water circulating systems are used, one associated with chocolate *b* drawn off from the storage receptacle 2 of the enrober 1 and treated (de-tempered) in the heating tank 10 of the tempering device 9, and the other with the re-tempered chocolate fed back to the enrober from the cooling (re-tempering) device 11 of the tempering device 9. By this arrangement, it is possible to start de-tempering the chocolate *b* when it passes through the weir device 15 on its way back to the tempering device 9, although the de-tempering effect will be greatest in the heating tank 10, in the water jacket of which the heater 30 is situated.

I claim:

1. Chocolate treatment apparatus for the purpose indicated comprising a treatment of device of the character indicated for utilizing the chocolate, a first storage receptacle associated with the treatment device, first conduit means connecting said first storage receptacle with said treatment device, pump means associated with said first conduit means to cause chocolate to be passed from said first storage receptacle to said treatment device, a heated second storage receptacle for detempering chocolate, a re-tempering device of the character indicated having an inlet and an outlet and associated with said second storage receptacle, means forming a communication between said second storage receptacle and the inlet of said retempering device such that chocolate can pass from said receptacle to said device, second conduit means extending from said first storage receptacle to a point to discharge into said second storage receptacle, pump means associated with said second conduit means to cause chocolate to pass through said second conduit means from said first receptacle to said second receptacle, third conduit means extending from the outlet of said retempering device and extending to a point to discharge into said first storage receptacle, and pump means associated with said retempering device to cause chocolate to be passed through said third conduit means from said retempering device to said first storage receptacle.

2. Apparatus according to claim 1 wherein a weir device having a weir plate is incorporated with said second conduit means adjacent said second storage receptacle whereby a minimum working level is imposed by the level of the top of the weir plate on the chocolate in said second storage receptacle.

3. Apparatus according to claim 2 wherein said weir device may be temporarily rendered inoperative by removal of the weir plate to permit complete draining of said second storage receptacle when necessary.

4. Apparatus according to claim 1 wherein said first and second storage receptacles, said first, second and third conduit means and said pump means associated with said first and second conduit means are provided with water jackets and the said water jackets are connected in series in a first system and a second system, each system having independent means for heating the water circulated through said systems, said first system comprising the following water jackets in circulatory order; said third conduit means, said first conduit means and pump means therefor, said first storage receptacle and return and said second system comprising the following water jackets in circulatory order; said second storage receptacle, said pump means for said second conduit means and said second conduit means.

5. Apparatus according to claim 1 wherein said second storage means has an independently heated water jacket means and said third conduit means, said first conduit means and said pump means therefor, said first storage receptacle, said second conduit means and said pump means therefor each have water jackets and said water jackets are connected in series in the above order to provide circulation circuits having heating means, independent of the water jacket means of said second storage means.

References Cited in the file of this patent
UNITED STATES PATENTS

| | | |
|---|---|---|
| 1,843,859 | Baker et al. | Feb. 2, 1932 |
| 2,070,558 | Beck | Feb. 16, 1937 |
| 2,236,692 | Neil | Apr. 1, 1941 |
| 2,313,705 | Jack | Mar. 9, 1943 |
| 2,531,773 | Greer | Nov. 28, 1950 |
| 2,725,815 | Hansen | Dec. 6, 1955 |
| 2,784,096 | Ciccone | Mar. 5, 1957 |